United States Patent [19]

Irick, Jr. et al.

[11] 4,164,480

[45] Aug. 14, 1979

[54] POLYCHROMOPHORIC ULTRAVIOLET STABILIZERS AND THEIR USE IN ORGANIC COMPOSITIONS

[75] Inventors: Gether Irick, Jr.; James C. Ownby; Richard H. S. Wang, all of Kingsport, Tenn.

[73] Assignee: Eastman Kodak Company, Rochester, N.Y.

[21] Appl. No.: 868,086

[22] Filed: Jan. 9, 1978

[51] Int. Cl.² ............... C07D 211/46; C08K 5/34; C08K 5/35; C08K 5/47

[52] U.S. Cl. ............... 252/402; 260/45.8 N; 260/45.8 NT; 260/45.8 NZ; 260/45.8 SN; 260/398.5; 260/800; 546/187; 252/401; 252/403; 252/405; 252/406

[58] Field of Search ............ 260/293.64, 293.88, 260/293.63, 45.8 NP; 546/187; 252/402, 403

[56] References Cited

U.S. PATENT DOCUMENTS

| | | | |
|---|---|---|---|
| 2,746,964 | 5/1956 | Biel | 260/293.64 |
| 2,856,407 | 10/1958 | Biel | 260/293.64 |
| 3,840,494 | 10/1974 | Murayama et al. | 260/293.63 |
| 3,993,655 | 11/1976 | Rasberger et al. | 260/45.8 NP |
| 4,014,887 | 3/1977 | Randell et al. | 260/293.63 |
| 4,069,196 | 1/1978 | Ramey et al. | 260/293.64 |
| 4,075,165 | 2/1978 | Soma et al. | 260/45.8 NP |
| 4,118,369 | 10/1978 | Minagawa et al. | 260/45.8 NP |
| 4,124,564 | 11/1978 | Minagawa et al. | 260/45.8 NP |

*Primary Examiner*—Howard E. Schain
*Assistant Examiner*—R. A. White
*Attorney, Agent, or Firm*—Clyde L. Tootle; Daniel B. Reece, III

[57] ABSTRACT

The invention relates to polychromophoric compounds which have been found to be effective ultraviolet stabilizers. The invention also relates to ultraviolet degradable organic compositions containing a stabilizing amount of the polychromophoric composition to prevent such degradation. These stabilizers are effective in the presence of other additives commonly employed in polymeric compositions including, for example, pigments, colorants, fillers, reinforcing agents and the like. These ultraviolet stabilizers may also be incorporated into the organic compositions in the polymer melt or dissolved in the polymer dope, or coated on the exterior of the molded article, film or extruded fiber.

24 Claims, No Drawings

POLYCHROMOPHORIC ULTRAVIOLET STABILIZERS AND THEIR USE IN ORGANIC COMPOSITIONS

This invention relates to polychromophoric ultraviolet stabilizers and their use in organic compositions. More particularly, the invention relates to polychromophoric compositions and the stabilization of ultraviolet degradable organic compositions against deterioration resulting from the exposure to such radiations with such polychromophoric compositions.

The degradative effects of ultraviolet light on various organic compositions is well known in the art. The photo-deterioration or degradation is of particular concern with organic photo-degradable compositions which are exposed to ultraviolet light, such as sunlight, for long periods of time. One group of such photo-degradable organic compositions are polymeric compositions such as polyolefins, polyesters, polyurethanes and the like. On exposure to sunlight for extended periods of time, these polymeric compositions degrade and their physical properties are reduced to render the polymeric composition less useful for most applications. Therefore, considerable effort has been directed to providing a solution to the photo-degradation problem of polymeric compositions. As a result of this effort, there have been discovered many additives and stabilizers which improve the stability of polymeric compositions.

Moreover, various additives and stabilizers exhibit the power to absorb ultraviolet radiation within the band of 2900 to 4000 Å. and, when incorporated in various plastic materials such as transparent sheets, the resultant sheet acts as a filter for all the radiation passing through and will transmit only such radiations as are not absorbed by the sheet and/or the absorbing agent. It is thus possible to screen out undesirable radiations and utilize the resulting transparent sheet as a filter in many technical and commercial applications, such as wrappings for food products and the like.

While there are many additives, stabilizers and mixtures thereof which are known in the art to improve the ultraviolet light stability of organic compositions, there is a need in the art for more efficient and effective stabilizers to prevent the photo-degradation of organic compositions susceptible to photo-degradation. Therefore, to provide a more effective and efficient ultraviolet stabilizer for organic compositions susceptible to such degradation would be an advance in the state of the art.

It is, therefore, an object of the present invention to provide more effective and efficient ultraviolet light stabilizer compositions.

Another object of the present invention is to provide useful compositions characterized by improved resistance to ultraviolet degradation and deterioration.

A further object of the present invention is to provide compositions containing polychromophoric compositions which are resistant to ultraviolet degradation.

Another and further object of this invention is to provide processes for improving the resistance of organic materials to deterioration and degradation by actinic radiation and especially ultraviolet radiation.

A still further object of this invention is to provide compositions and processes for improving the resistance of organic materials to deterioration and degradation by actinic radiations, including short wave-length visible radiations.

Further objects and advantages of the invention will be apparent to those skilled in the art from the accompanying disclosure and claims.

In accordance with the present invention, polychromophoric compositions are provided which are useful as ultraviolet stabilizers or ultraviolet screening agents. These organic compositions contain at least one heterocyclic group containing composition connected to a piperidinyl moiety. The polychromophoric compositions of the present invention have the following structure:

wherein A is a group having the structure

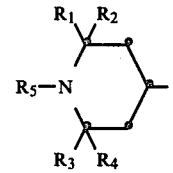

$R_1$ and $R_2$ and $R_3$ and $R_4$ are each alkyl having 1–6 carbons; $R_1$ and $R_2$ and $R_3$ and $R_4$, together with the carbon to which they are bound, form a cyclopentyl or cyclohexyl ring, which is unsubstituted or substituted with a methyl group; and $R_5$ is hydrogen, oxyl, alkyl having 1 to 12 carbon atoms, β-methoxyethyl, alkenyl having 3 or 4 carbon atoms, propargyl, benzyl or alkyl substituted benzyl.

B is a heterocyclic phenyl group having the structure

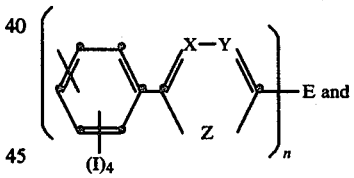

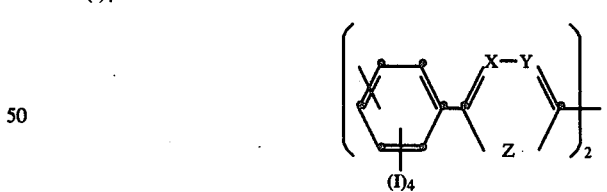

wherein X and Y are a carbon atom or a nitrogen atom; Z is an oxygen atom, a sulfur atom, or a nitrogen atom containing a hydrogen atom or a substituted or unsubstituted lower alkyl group having 1 to 12 carbon atoms; I is hydrogen, fluoro, chloro, bromo, lower alkyl, substituted lower alkyl, cycloalkyl, substituted cycloalkyl, phenyl, substituted phenyl, lower alkylphenyl, phenyl-substituted-phenyl, alkoxy, phenyloxy, substituted amino, and cyano. I is present on all positions of the benzenoid ring, except the carbon atom attached to the heterocyclic ring and the carbon atom attached to the carbonyloxy group.

E is substituted or unsubstituted alkylene and arylene; n is an integer from 1 to 6.

Suitable A groups are 2,2,6,6-tetramethylpiperidin-4-yl-, 1,2,2,6,6-pentamethylpiperidin-4-yl-, 1-oxo-2,2,6,6-tetramethylpiperidin-4-yl-, and the like.

Suitable B groups are, for example, moieties having the structure:

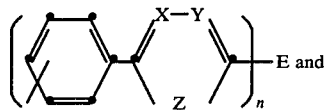

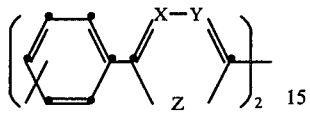

and include substituted and unsubstituted 1,3,4-oxadiazol-2,5-diyl, 1,3,4-thiadiazol-2,5-diyl, 1,2,4-triazol-3,5-diyl, oxazol-diyl, thiazoldiyl and imidazol-diyl and the like.

Examples of suitable 1,3,4-oxadiazol-2,5-diyl moieties are those having the structures:

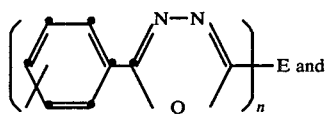

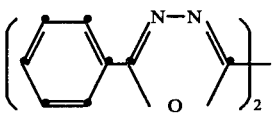

wherein E is a substituted or unsubstituted alkylene having 1 to 12 carbon atoms or arylene having 6 to 18 carbon atoms; n is an integer from 1 to 6; such as 4,4'-(1,3,4-oxadiazol-2,5-diyl)diphenyl, 4,4'[5,5'-tetramethylene bis[1,3,4-oxadiazol-2-yl)]diphenyl, 4,4'-[5,5'-bis(1,3,4-oxadiazol-2,2'-diyl)diphenyl, 4,4'-[5,5'-(m-phenylene bis[1,3,4-oxadiazol-2-yl)diphenyl, 4,4',4''-[5,5',5''-(1,3,5-phenylene tris(1,3,4-oxadiazol-2-yl)triphenyl and the like.

Examples of suitable 1,3,4-thiadiazol-2,5-diyl moieties are those having the structure

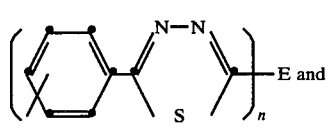

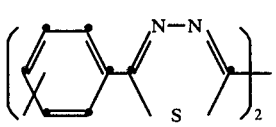

wherein E is a substituted or unsubstituted alkylene or arylene; n is an integer from 1 to 6; such as 4,4'-(1,3,4-thiazol-2,5-diyl)diphenyl, 4,4'-(5,5'-tetramethylene bis(1,3,4-thiadiazol-2-yl)diphenyl, 4,4'-[5,5'bis(1,3,4-thiadiazol-2,2'-diyl)]diphenyl, 4,4'-[5,5'-(m-phenylene bis[1,3,4-thiadiazol-2-yl)diphenyl, 4,4',4''-[5,5',5''-(1,3,5-phenylene tris(1,3,4-oxadiazol-2-yl) triphenyl and the like.

Examples of suitable 1,3,4-triazol-2,4'-diyl moieties are those having the structures:

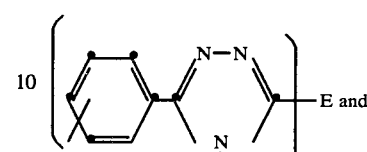

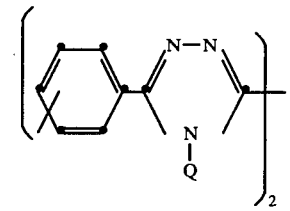

wherein E is a substituted or unsubstituted alkylene and arylene; n is an integer from 1 to 6, Q is hydrogen or a substituted or unsubstituted lower alkyl group containing 1 to 12 carbon atoms; such as 4,4'-(1H-1,34-triazol-2,5-diyl)diphenyl, 4,4'(4H-1,3,4-triazol-2,5-diyl)diphenyl, 4,4'-5,5'-tetramethylene bis(4H-1,3,4-triazol-2-yl) diphenyl, 4,4'(4-methyl-1,3,4-triazol-2,5-diyl)diphenyl, 4,4'-(1-methyl-1,3,4-triazol-2,5-diyl)diphenyl, 4,4'-[5,5'-m-phenylene bis(4-methyl-1,3,4-triazol-2-yl)diphenyl, and the like.

Examples of suitable oxazol-diyl moieties are those having the structures:

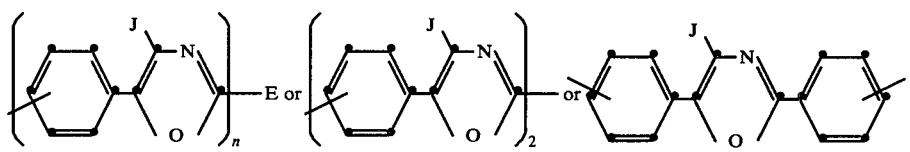

wherein E is a substituted or unsubstituted alkylene and arylene, or the same as $R_1$; J is the same as $R_1$ or a substituted or unsubstituted alkylene having 1 to 12 carbon atoms or arylene having 6 to 18 carbon atoms; n is an integer from 1 to 6; such as 4,4'-(oxazol-2,5-diyl)-diphenyl, 4,4'-(4-methyloxazol-2,5-diyl)diphenyl, 4,4'-(4-phenyloxazol-4,5-diyl)diphenyl, 3,4'-(4-methyloxazol-2,5-diyl)diphenyl and the like.

Examples of suitable thiazol-diyl moieties are those having the structures:

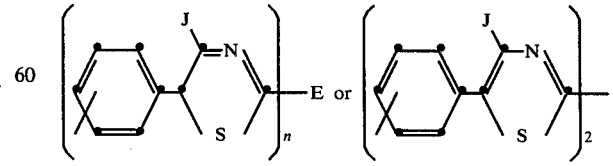

wherein E is a substituted or unsubstituted phenyl, alkylene and arylene, or the same as $R_1$; J is the same as $R_1$ or a substituted or unsubstituted alkylene or arylene; n is an integer from 1 to 6; such as 4,4'-(thiazol-2,5-diyl)- diphenyl, 4,4'-(4-methylthiazol-2,5-diyl)diphenyl, 4,4'-(2-methylthiazol-4,5-diyl)diphenyl, 4,4'-(thiazol-4,5-diyl)diphenyl, and the like.

Examples of suitable imidazol-diyl moieties are those having the structures:

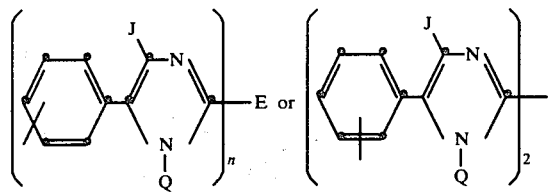

wherein E is a substituted or unsubstituted alkylene and arylene, or the same as $R_1$; J is the same as $R_1$, or a substituted or unsubstituted alkylene or arylene; n is an integer from 1 to 6; Q is hydrogen or a substituted or unsubstituted lower alkyl group having 1 to 12 carbon atoms, such as 4,4'-(imidazol-2,5-diyl)diphenyl, 4,4'-(1-methylimidazol-2,5-diyl)diphenyl, 4,4'-(2-methylimidazol-4,5-diyl)diphenyl, 4,4'-(4-methylimidazol-2,5-diyl)diphenyl, 4,4'-(1,4-dimethylimidazol-2,5-diyl)diphenyl and 4,4'-(1,2-dimethylimidazol-4,5-diyl)diphenyl and the like.

The heterocyclic compositions can be added to organic compositions which are susceptible to ultraviolet degradation. Such compositions include, for example, polymeric compositions such as polyester fiber and molding compositions, such as polyethylene terephthalate, polytetramethylene terephthalate and the like; white pigmented polyolefins such as, for example, $TiO_2$ pigmented high, medium and low density polyethylene and polypropylene; and polyurethanes.

The polychromophoric compositions, as effective ultraviolet stabilizers or screening agents, are generally used in an amount of from 0.01 to 10%, by weight, based on the weight of the organic material to which they are added. While a detectable amount of ultraviolet screening and stabilization may be obtained with amounts less than 0.01%, this amount of stabilization or screening would be of little practical utility in a commercial application. Moreover, while amounts greater than 10% by weight provide effective ultraviolet stability and screening, such concentrations are undesirable because of cost and the deleterious effect which such concentrations may have on the mechanical properties of the organic composition in which the stabilizer is incorporated. Preferably, the stabilizer is used in an amount of from about 0.1 to about 3%, by weight. For example, an amount of 0.5%, by weight, of the stabilizer effectively stabilizes polytetramethylene terephthalate plastic compositions.

The ultraviolet stabilized organic compositions of the present invention may also contain other additives, pigments, colorants, stabilizers and the like. For example, polymeric compositions, such as polyesters, polyurethanes and polyolefins, may also contain and generally do contain other additives such as white or colored pigments or colorants, antioxidants, plasticizers, flow aids, processing aids, polymeric modifiers and the like.

These novel polychromophoric ultraviolet stabilizers may be incorporated into organic compositions by melt-blending or may be added onto the surface of an organic plastic material prior to being molded into a suitable object. These materials can also be added to coatings and the like which can be applied to the surface of a molded object.

This invention will be further illustrated by the following examples although it will be understood that these examples are included merely for purposes of illustration and are not intended to limit the scope of the invention.

EXAMPLE 1

Bis(2,2,6,6-tetramethyl-4-piperidinyl)-4,4'-(1,3,4-oxadiazole-2,5-diyl)dibenzoate, (I) can be prepared by the following procedure:

To a solution of hydrazine (0.01 mole) and sodium bicarbonate (15 g.) in 150 ml. of water, monoterephthaloyl chloride (0.18 mole) in 125 ml. of THF was added slowly with stirring. After stirring for an additional 30 minutes, the Product A was filtered and washed with 1 liter of water (m.p. 295°–8°, quantitative yield). A solution of A (0.056 mole) and 100 ml. of phosphorus oxychloride in 200 ml. of toluene was refluxed for 6 hours. The product B was filtered and washed with water (m.p. 268°–270°, yield 80%). A solution of B (0.042 mole) and potassium hydroxide (0.1 mole) in 700 ml. of 60% ethanol was refluxed for 10 hours. The mixture was then acidified with 6 N HCl. The product was filtered and identified as the corresponding bis acid (m.p. <300°, quantitative yield). The bis acid (0.013 mole) was refluxed with 50 ml. of thionyl chloride in 200 ml. of chlorobenzene for 10 hours. After removal of excess thionyl chloride, the product C was obtained by filtration (m.p. 208°–210°, yield 90%). A mixture of 2,2,6,6-tetramethylpiperidin-4-ol (0.065 mole), triethylamine (0.065 mole) and C (0.030 mole) in 300 ml. of ethylene chloride was refluxed for 10 hours. After cooling and filtering off amine salt, Product I was obtained by adding heptane to the filtrate (m.p. 213°–7° C., yield 50%).

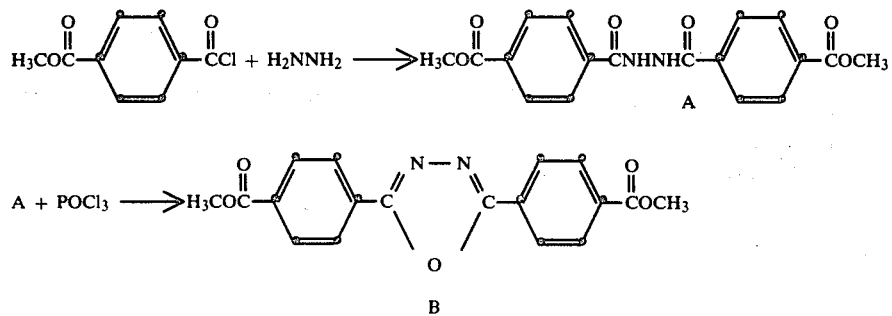

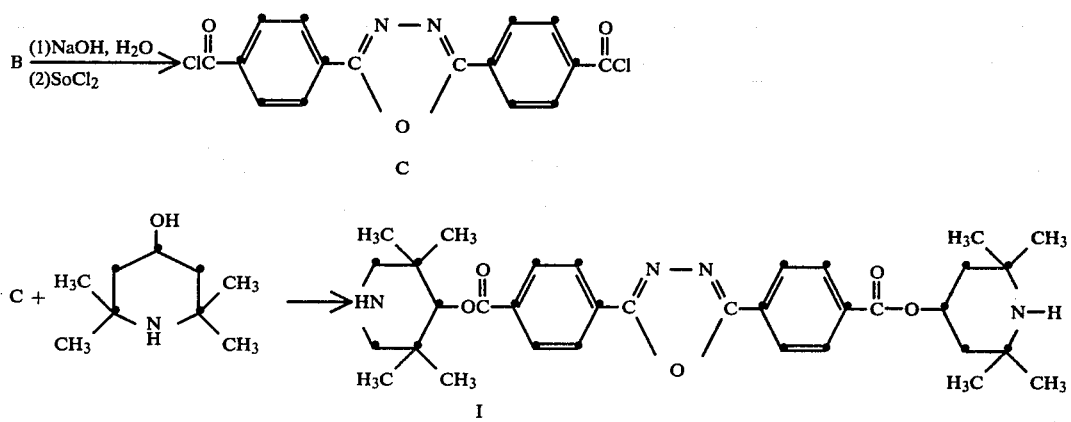

EXAMPLE 2

Bis(2,2,6,6-tetramethyl-4-piperidinyl-4,4'-(1,3,4-thiadiazol-2,5-diyl)dibenzoate, (II) can be prepared by the following procedure:

1,2-di(4-Carbomethoxybenzoyl)hydrazine (A), prepared as in Example 1, in pyridine was refluxed with phosphorus pentasulfide for 15 hours. The mixture was cooled and poured into 20% ethanol. After the solution was neutralized with sodium bicarbonate, the product, dimethyl-4,4'-(1,3,4-thiadiazol-2,5-diyl)dibenzoate (D), was obtained by filtration (m.p. 268°–270°, yield 60%). Then II was obtained by reacting D in a similar manner as in Example 1.

EXAMPLE 3

Bis(2,2,6,6-tetramethyl-4-piperidinyl-4,4'-(4-methyl-1,2,4-triazol-3,5-diyl)dibenzoate (III) can be prepared by the following procedure:

A solution of N-methyl-p-carbmethoxybenzamide in chloroform was treated with phosphorus pentachloride to give E. Then E was reacted with p-carbmethoxybenzoyl hydrazine to yield dimethyl-4,4'-(4-methyl-1,2,4-triazol-3,5-diyl)dibenzoate, (F). Then III was obtained by reacting F in a similar manner as in Example 1.

EXAMPLE 4

Bis(2,2,6,6-tetramethyl-4-piperidinyl-4,4'-(5,5'-bi-1,3,4-oxadiazol-2,2'-diyl)dibenzoate, (IV) can be prepared by the following procedure:

A mixture of oxalyl dihydrazide (0.01 mole), lithium chloride (2.0 g) and p-carbmethoxybenzoyl chloride (0.02 mole) in N-methyl pyrrolidinone (100 ml.) was stirred at room temperature overnight. The mixture was poured into 500 ml. of ice-water. The product, 1,1'-oxalylbis[2-(p-carbmethoxybenzoyl hydrazine], G, was obtained by filtration. Then IV was produced by reacting G in a similar manner as in Example 1.

EXAMPLE 5

Bis(2,2,6,6-tetramethyl-4-piperidinyl-4,4'-(4-methyloxazol-2,5-diyl)dibenzoate (V) can be produced by the following procedure:

α-(p-Carbomethoxybenzamido)-p-carbmethoxypropiophenone, obtained by reaction of p-carbmethoxybenzamide and α-bromo-p-carbmethoxypropiophenone, was refluxed in toluene with phosphorus oxychloride to yield 70% dimethyl-4,4'-(4-methyloxazol-2,5-diyl)dibenzoate, D'. Then V was obtained in a similar manner as in Example 1.

EXAMPLE 6

Bis(2,2,6,6-tetramethyl-4-piperidinyl-4,4'-(2-methyloxazol-4,5-diyl)dibenzoate (VI) can be produced by the following procedure:

p,p'-Dicarbmethoxybenzoin, obtained by benzoin condensation of methyl p-formylbenzoate, was refluxed with ammonium acetate, paraldehyde in glacial arctic acid for 2 hours. The product, dimethyl-4,4'-(2-methyloxazol-4,5-diyl)dibenzoate, E', was obtained by filtration after cooling. Then VI was obtained in a similar manner as in Example 1.

EXAMPLE 7

The ultraviolet stabilization provided by the heterocyclic stabilizer of the present invention is shown for poly(tetramethylene terephthalate) in Table 1.

A dry mixture of the stabilizer and granulated poly(tetramethylene terephthalate) was extruded into 1/16 in. diam. rods, pelletized and injection molded into $2\frac{1}{2} \times \frac{1}{2} \times 1/16$-inch flat bars; these flat bars were exposed to a 280–700 nm. mercury lamp source until a flatwise impact strength strength of less than 6 was obtained (initial values were all >17). The test results are summarized in Table 1.

Table 1

| Effectiveness of Ultraviolet Stabilizers in Poly(tetramethylene terephthalate) | | | |
|---|---|---|---|
| | FWIS (Flatwise Impact Strength) | | |
| Compound (0.5%) | Initial | 2 Weeks | 3 Weeks |
| None | 17 | 1 | 1 |
| I | 18 | 18 | 19 |
| II | 20 | 19 | 20 |
| III | 18 | 18 | 16 |
| IV | 19 | 17 | 15 |
| V | 20 | 20 | 20 |
| VI | 19 | 17 | 17 |
| *Tinuvin 770 | 18 | 12 | 2 |

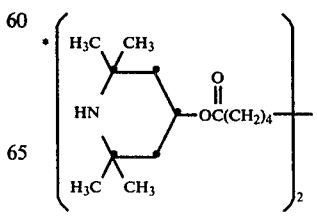

EXAMPLE 8

The effectiveness of the heterocyclic stabilizer of the present invention as ultraviolet light stabilizers for TiO$_2$-pigmented polypropylene is shown in Table 2.

Table 2

Effectiveness of Ultraviolet Stabilizers in TiO$_2$-Pigmented Polypropylene (5-mil in Uvatest)

| Compound (0.5% by Wt.) | Hrs. to Brittleness |
| --- | --- |
| None | 300 |
| I | 3000 |
| Tinuvin 770 | 3000 |

EXAMPLE 9

The effectiveness of the heterocyclic stabilizers of the present invention as ultraviolet stabilizers for polyurethane elastomers is shown in Table 3.

Table 3

Effectiveness of Ultraviolet Stabilizers in Polyurethane Elastomers

| Compound (1.0% by Wt.) | QUV Test After 500 Hrs. (CMD Color) | |
| --- | --- | --- |
| | Yellowness (+b) | Darkness (Rd) |
| None | 32.3 | 32.2 |
| I | 29.3 | 23.0 |
| Tinuvin 770/Tinuvin 328* (50:50) | 29.7 | 25.5 |

These polychromophoric compositions find particular utility as ultraviolet stabilizers in organic compositions requiring ultraviolet stability. Such compositions include polymeric compositions such as, for example, polyester fiber and molding compositions, poly-α-olefins, polyamides, acrylics, polyurethanes and the like, as well as molded or shaped articles, film and coatings formed from such materials and the like. Such compositions also include natural and synthetic rubbers, such as natural rubber, as well as organic materials, such as oils, fats, and unsaturated organic materials and materials having such materials contained therein such as paints, varnishes, cosmetics and the like.

The invention has been described in detail with particular reference to preferred embodiments thereof, but it will be understood that variations and modifications can be effected within the spirit and scope of the invention.

We claim:

1. A polychromophoric compound having the formula:

wherein A is a group having the structure:

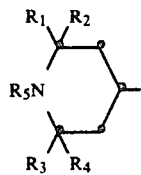

wherein

R$_1$ and R$_2$ and R$_3$ and R$_4$ are each alkyl having 1–6 carbons; R$_1$ and R$_2$ and R$_3$ and R$_4$, together with the carbon to which they are bound, form a cyclopentyl or cyclohexyl ring, which is unsubstituted or substituted with a methyl group; and R$_5$ is hydrogen, oxyl, alkyl having 1 to 12 carbon atoms, β-methoxyethyl, alkenyl having 3 or 4 carbon atoms, propargyl, benzyl or alkyl substituted benzyl;

B is a heterocyclic group having the structures

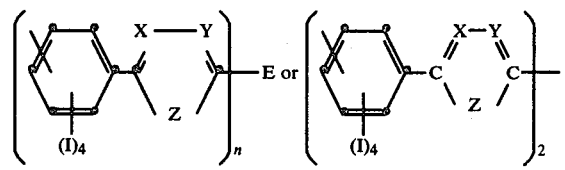

wherein

X and Y are a carbon atom or a nitrogen atom or a carbon atom containing an alkyl group containing 1 to 12 carbon atoms or a carbon atom containing an aryl group containing 6 to 10 carbon atoms; Z is an oxygen atom, a sulfur atom, or a nitrogen atom containing a hydrogen atom or a substituted or unsubstituted lower alkyl group having 1 to 12 carbon atoms; I is hydrogen, chloro, bromo, fluoro, lower alkyl, substituted lower alkyl, cycloalkyl, substituted cycloalkyl, aryl, substituted aryl, lower alkylaryl, aryl-substituted-aryl, alkoxy, aryloxy, substituted amino or cyano, said I being present on all positions of the benzenoid rings, except the carbon atom attached to the heterocyclic ring and the carbon atom attached to the carbonyloxy group, E is a substituted or unsubstituted branched or unbranched alkylene group containing 1 to 12 carbon atoms or arylene group containing 6 to 18 carbon atoms and n is 1 or 2.

2. Polychromophoric compounds according to claim 1 having the formula

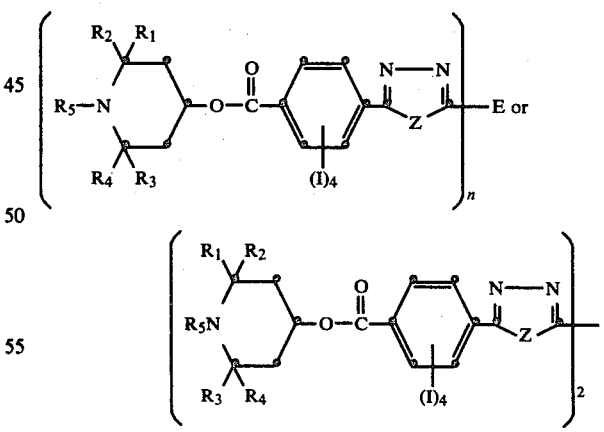

R$_1$ and R$_2$ and R$_3$ and R$_4$ are each alkyl having 1–6 carbons; R$_1$ and R$_2$ and R$_3$ and R$_4$, together with the carbon to which they are bound, form a cyclopentyl or cyclohexyl ring, which is unsubstituted or substituted with a methyl group; and R$_5$ is hydrogen, oxyl, alkyl having 1 to 12 carbon atoms, β-methoxyethyl, alkenyl having 3 or 4 carbon atoms, propargyl, benzyl or alkyl substituted benzyl;

Z is an oxygen atom, a sulfur atom, or a nitrogen atom containing a hydrogen atom or a substituted or unsubstituted lower alkyl group having 1 to 12 carbon atoms; I is hydrogen, chloro, bromo, fluoro, lower alkyl, substituted lower alkyl, cycloalkyl, substituted cycloalkyl, aryl, substituted amino or cyano, said I being present on all positions of the benzenoid rings, except the carbon atom attached to the heterocyclic ring and the carbon atom attached to the carbonyloxy group, E is a substituted or unsubstituted alkylene or arylene and n is 2.

3. Polychromophoric compounds according to claim 1 having the formula

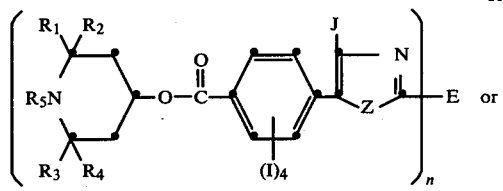 or

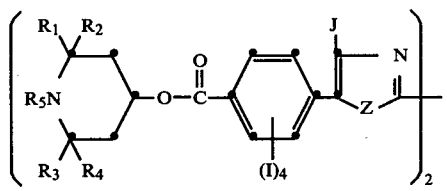

$R_1$ and $R_2$ and $R_3$ and $R_4$ are each alkyl having 1–6 carbons; $R_1$ and $R_2$ and $R_3$ and $R_4$, together with the carbon to which they are bound, form a cyclopentyl or cyclohexyl ring, which is unsubstituted or substituted with a methyl group; and $R_5$ is hydrogen, oxyl, alkyl having 1 to 12 carbon atoms, β-methoxyethyl, alkenyl having 3 to 4 carbon atoms, propargyl, benzyl or alkyl substituted benzyl; J is a substituted or unsubstituted alkyl group having 1 to 12 carbon atoms or an aryl group having 6 to 10 carbon atoms;

Z is an oxygen atom, a sulfur atom, or a nitrogen atom containing a hydrogen atom or a substituted or unsubstituted lower alkyl group having 1 to 12 carbon atoms; I is hydrogen, chloro, bromo, fluoro, lower alkyl, substituted lower alkyl, cycloalkyl, substituted cycloalkyl, aryl, substituted amino or cyano, said I being present on all positions of the benzenoid rings, except the carbon atom attached to the heterocyclic ring and the carbon atom attached to the carbonyloxy group;

E is a substituted or unsubstituted alkylene or arylene and n is 2.

4. Polychromophoric compounds according to claim 1 having the formula

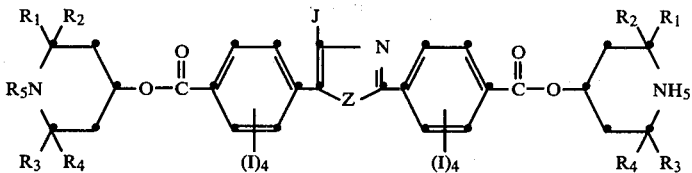

$R_1$ and $R_2$ and $R_3$ and $R_4$ are each alkyl having 1–6 carbons; $R_1$ and $R_2$ and $R_3$ and $R_4$, together with the carbon to which they are bound, form a cyclopentyl or cyclohexyl ring, which is unsubstituted or substituted with a methyl group; and $R_5$ is hydrogen, oxyl, alkyl having 1 to 12 carbon atoms, β-methoxyethyl, alkenyl having 3 or 4 carbon atoms, propargyl, benzyl or alkyl substituted benzyl; J is a substituted or unsubstituted alkyl group having 1 to 12 carbon atoms or an aryl group having 6 to 10 carbon atoms;

Z is an oxygen atom, a sulfur atom, or a nitrogen atom containing a hydrogen atom or a substituted or unsubstituted lower alkyl group having 1 to 12 carbon atoms; I is hydrogen, chloro, bromo, fluoro, lower alkyl, substituted lower alkyl, cycloalkyl, substituted cycloalkyl, aryl, substituted amino or cyano, said I being present on all positions of the benzenoid rings, except the carbon atom attached to the heterocyclic ring and the carbon atom attached to the carbonyloxy group.

5. A polychromophoric compound according to claim 1 having the formula

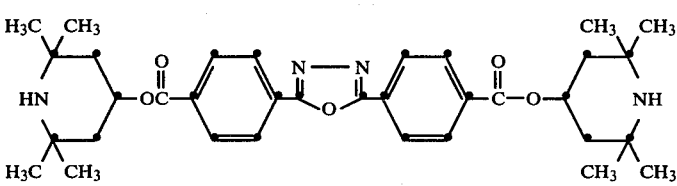

6. A polychromophoric compound according to claim 2 having the formula

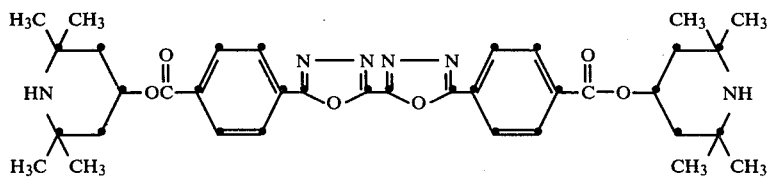

7. A polychromophoric compound according to claim 2 having the formula

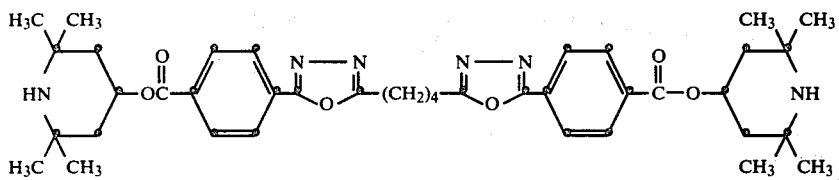

8. A polychromophoric compound according to claim 1 having the formula

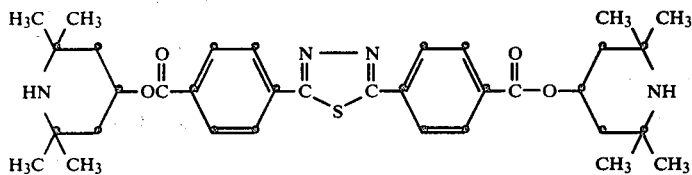

9. A polychromophoric compound according to claim 1 having the formula

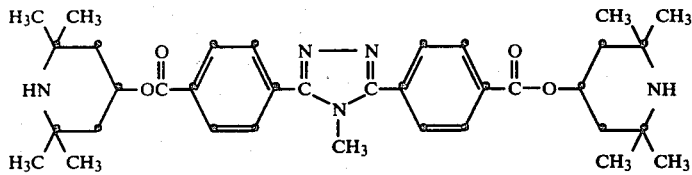

10. A polychromophoric compound according to claim 4 having the formula

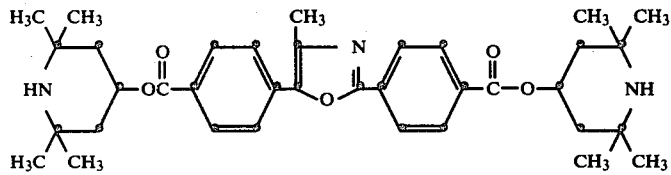

11. A polychromophoric compound according to claim 4 having the formula

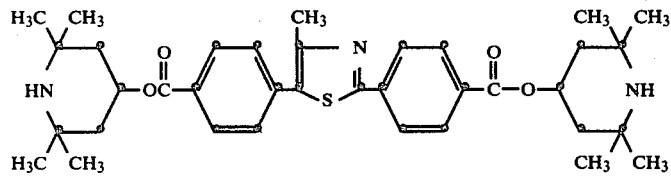

12. A polychromophoric compound according to claim 4 having the formula

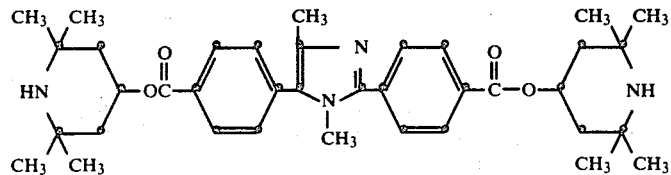

13. An organic composition susceptible to ultraviolet degradation stabilized against such degradation with a stabilizing amount of compounds having the formula:

wherein A is a group having the structure

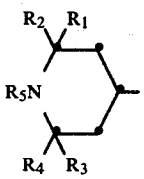

wherein
R₁ and R₂ and R₃ and R₄ are each alkyl having 1-6 carbons; R₁ and R₂ and R₃ and R₄, together with the carbon to which they are bound, form a cyclopentyl or cyclohexyl ring, which is unsubstituted or substituted with a methyl group; and R₅ is hydrogen, oxyl, alkyl having 1 to 12 carbon atoms, β-methoxyethyl, alkenyl having 3 or 4 carbon atoms, propargyl, benzyl or alkyl substituted benzyl;

B is a heterocyclic group having the structures

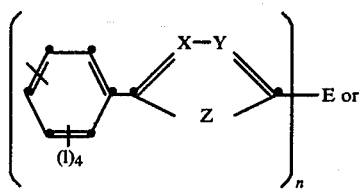

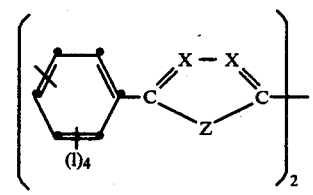

wherein
X and Y are a carbon atom, a carbon atom containing an alkyl group having 1 to 12 carbon atoms, a carbon atom containing an aryl group having 6 to 10 carbon atoms or a nitrogen atom; Z is an oxygen atom, a sulfur atom, or a nitrogen atom containing a hydrogen atom or a substituted or unsubstituted lower alkyl group having 1 to 12 carbon atoms; I is hydrogen, chloro, bromo, fluoro, lower alkyl, substituted lower alkyl, cycloalkyl, substituted cycloalkyl, aryl, substituted aryl, lower alkylaryl, aryl-substituted-aryl, alkoxy, aryloxy, substituted amino or cyano, said I being present on all positions of the benzenoid rings, except the carbon atom attached to the heterocyclic ring and the carbon atom attached to the carbonyloxy group, E is a substituted or unsubstituted branched or unbranched alkylene group containing 1 to 12 carbon atoms or arylene group containing 6 to 18 carbon atoms and n is 1 or 2.

14. An organic composition susceptible to ultraviolet degradation stabilized against such degradation with a stabilizing amount of compounds according to claim 13 having the formula

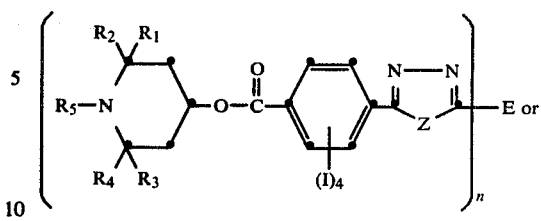

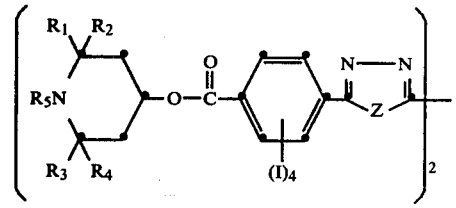

R₁ and R₂ and R₃ and R₄ are each alkyl having 1-6 carbons; R₁ and R₂ and R₃ and R₄, together with the carbon to which they are bound, form a cyclopentyl or cyclohexyl ring, which is unsubstituted or substituted with a methyl group; and R₅ is hydrogen, oxyl, alkyl having 1 to 12 carbon atoms, β-methoxyethyl, alkenyl having 3 or 4 carbon atoms, propargyl, benzyl or alkyl substituted benzyl;

Z is an oxygen atom, a sulfur atom, or a nitrogen atom containing a hydrogen atom or a substituted or unsubstituted lower alkyl group having 1 to 12 carbon atoms; I is hydrogen, chloro, bromo, fluoro, lower alkyl, substituted lower alkyl, cycloalkyl, substituted cycloalkyl, aryl, substituted amino or cyano, said I being present on all positions of the benzenoid rings, except the carbon atom attached to the heterocyclic ring and the carbon atom attached to the carbonyloxy group; E is a substituted or unsubstituted alkylene or arylene and n is 2.

15. An organic composition susceptible to ultraviolet degradation stabilized against such degradation with a stabilizing amount of compounds according to claim 13 having the formula

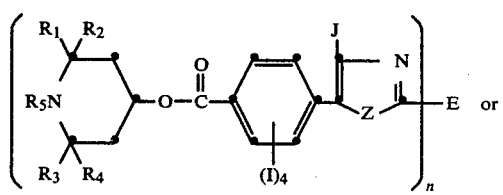

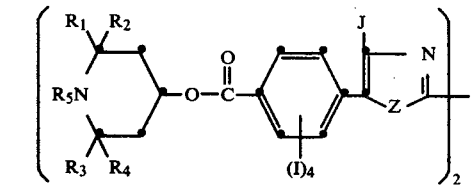

R₁ and R₂ and R₃ and R₄ are each alkyl having 1-6 carbons; R₁ and R₂ and R₃ and R₄, together with the carbon to which they are bound, form a cyclopentyl or cyclohexyl ring, which is unsubstituted or substituted with a methyl group; and R₅ is hydrogen, oxyl, alkyl having 1 to 12 carbon atoms, β-methoxyethyl, alkenyl having 3 or 4 carbon atoms, propargyl, benzyl or alkyl substituted benzyl; J is a substituted or unsubstituted alkyl group having 1 to 12 carbon atoms or an aryl group having 6 to 10 carbon atoms;

Z is an oxygen atom, a sulfur atom, or a nitrogen atom containing a hydrogen atom or a substituted or unsubstituted lower alkyl group having 1 to 12 carbon atoms; I is hydrogen, chloro, bromo, fluoro, lower alkyl, substituted lower alkyl, cycloalkyl, substituted cycloalkyl, aryl, substituted amino or cyano, said I being present on all positions of the benzenoid rings, except the carbon atom attached to the heterocyclic ring and the carbon atom attached to the carbonyloxy group;

E is a substituted or unsubstituted alkylene or arylene and n is 2.

16. An organic composition susceptible to ultraviolet degradation stabilized against such degradation with a stabilizing amount of compounds according to claim 13 having the formula

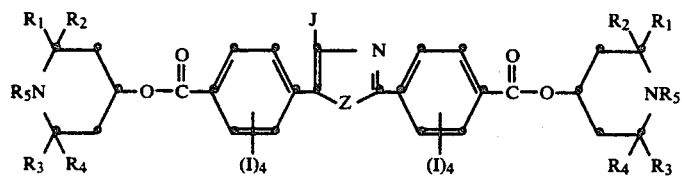

$R_1$ and $R_2$ and $R_3$ and $R_4$ are each alkyl having 1-6 carbons; $R_1$ and $R_2$ and $R_3$ and $R_4$, together with the carbon to which they are bound, form a cyclopentyl or cyclohexyl ring, which is unsubstituted or substituted with a methyl group; and $R_5$ is hydrogen, oxyl, alkyl having 1 to 12 carbon atoms, β-methoxyethyl, alkenyl having 3 or 4 carbon atoms, propargyl, benzyl or alkyl substituted benzyl; J is a substituted or unsubstituted alkyl group having 1 to 12 carbon atoms or an aryl group having 6 to 10 carbon atoms;

Z is an oxygen atom, a sulfur atom, or a nitrogen atom containing a hydrogen atom or a substituted or unsubstituted lower alkyl group having 1 to 12 carbon atoms; I is hydrogen, chloro, bromo, fluoro, lower alkyl, substituted lower alkyl, cycloalkyl, substituted cycloalkyl, aryl, substituted amino or cyano, said I being present on all positions of the benzenoid rings, except the carbon atom attached to the heterocyclic ring and the carbon atom attached to the carbonyloxy group.

17. An organic composition according to claim 14 containing a stabilizing amount of a compound having the formula

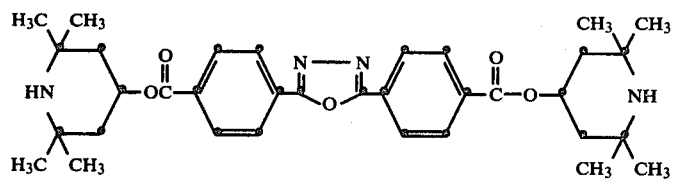

18. An organic composition according to claim 14 containing a stabilizing amount of a compound having the formula

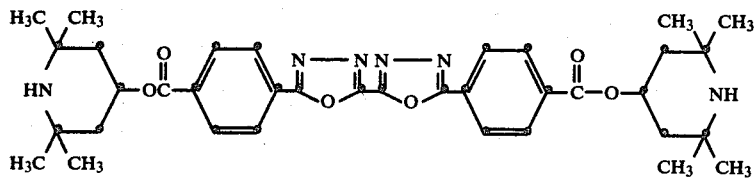

19. An organic composition according to claim 14 containing a stabilizing amount of a compound having the formula

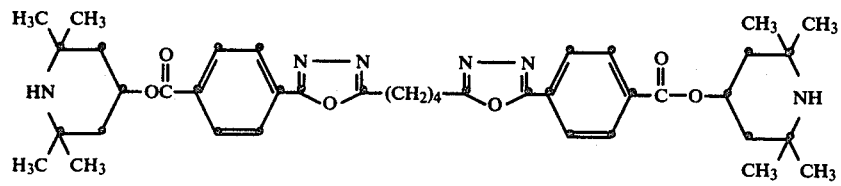

20. An organic composition according to claim 13 containing a stabilizing amount of a compound having the formula

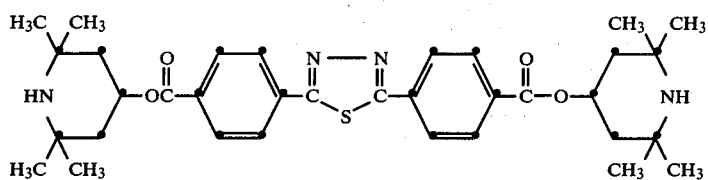

21. An organic composition according to claim 13 containing a stabilizing amount of a compound having the formula

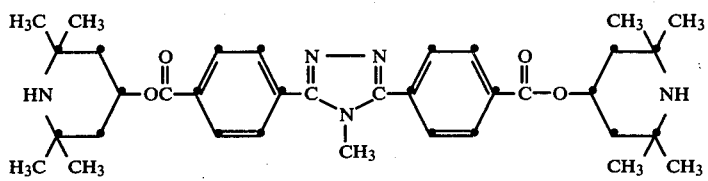

22. An organic composition according to claim 16 containing a stabilizing amount of a compound having the formula

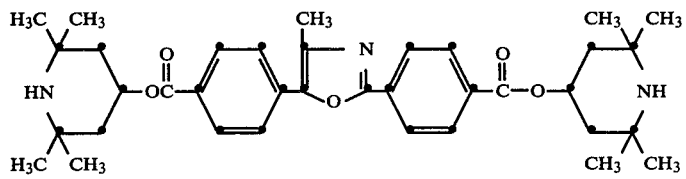

23. An organic composition according to claim 16 containing a stabilizing amount of a compound having the formula

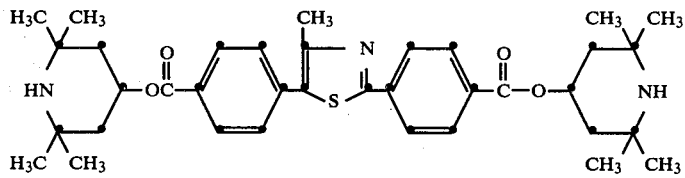

24. An organic composition according to claim 16 containing a stabilizing amount of a compound having the formula

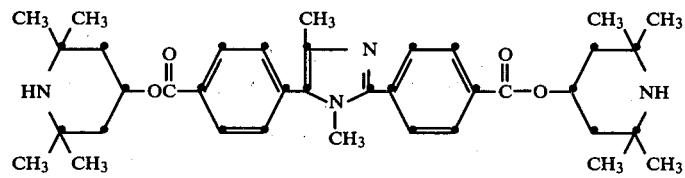

* * * * *